4 Sheets—Sheet 1.

H. J. MEDBERY.

Assignor to S. C. MEDBERY.

MACHINE FOR FORMING SEAMLESS TUBES FROM PULP.

No. 11,176. Reissued July 7, 1891.

WITNESSES:
C. W. Benjamin
Fred Smith

INVENTOR
Horace J. Medbery
BY Phillips & Abbott
his ATTORNEY

4 Sheets—Sheet 2.

H. J. MEDBERY.

Assignor to S. C. MEDBERY.

MACHINE FOR FORMING SEAMLESS TUBES FROM PULP.

No. 11,176. Reissued July 7, 1891.

WITNESSES:
C. W. Benjamin
Fred Smith

INVENTOR
Horace J. Medbery
BY Phillips Abbott
his ATTORNEY

4 Sheets—Sheet 3.

H. J. MEDBERY.

Assignor to S. C. MEDBERY.

MACHINE FOR FORMING SEAMLESS TUBES FROM PULP.

No. 11,176. Reissued July 7, 1891.

WITNESSES:

C. W. Benjamin

Fred Smith

INVENTOR

Horace J. Medbery

BY Phillips Abbott his ATTORNEY

4 Sheets—Sheet 4.
H. J. MEDBERY.
Assignor to S. C. MEDBERY.
MACHINE FOR FORMING SEAMLESS TUBES FROM PULP.
No. 11,176. Reissued July 7, 1891.
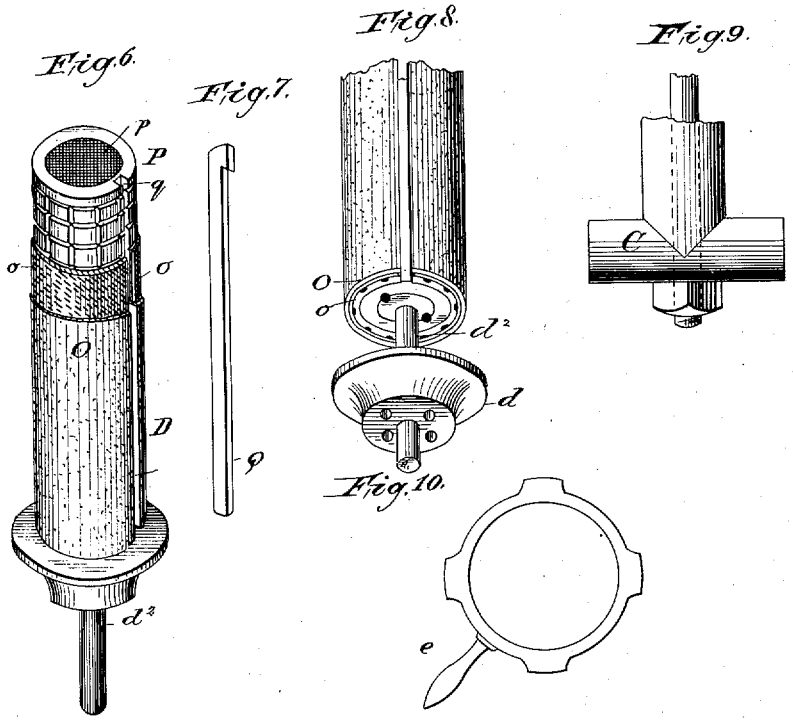
WITNESSES:
C. W. Benjamin
Fred Smith
INVENTOR
Horace J. Medbery
BY
Phillips Abbott
his ATTORNEY

UNITED STATES PATENT OFFICE.

HORACE J. MEDBERY, OF BALLSTON, ASSIGNOR TO STEPHEN C. MEDBERY, OF BALLSTON SPA, NEW YORK.

MACHINE FOR FORMING SEAMLESS TUBES FROM PULP.

SPECIFICATION forming part of Reissued Letters Patent No. 11,176, dated July 7, 1891.

Original No. 396,103, dated January 15, 1889. Application for reissue filed July 17, 1889. Serial No. 317,815.

*To all whom it may concern:*

Be it known that I, HORACE J. MEDBERY, of Ballston, in the county of Saratoga and State of New York, have invented certain new and useful Improvements in Machines for Forming Seamless Tubes from Pulp, which improvements are fully set forth in the following specification, reference being made therein to the accompanying drawings.

My invention relates to machines for making seamless tubes, pipes, or other analogous articles of a uniform diameter throughout from paper or wood pulp; and it consists in the peculiar construction and arrangement of parts adapted to form sections of pipe, as hereinafter described.

Figures 1, 2:
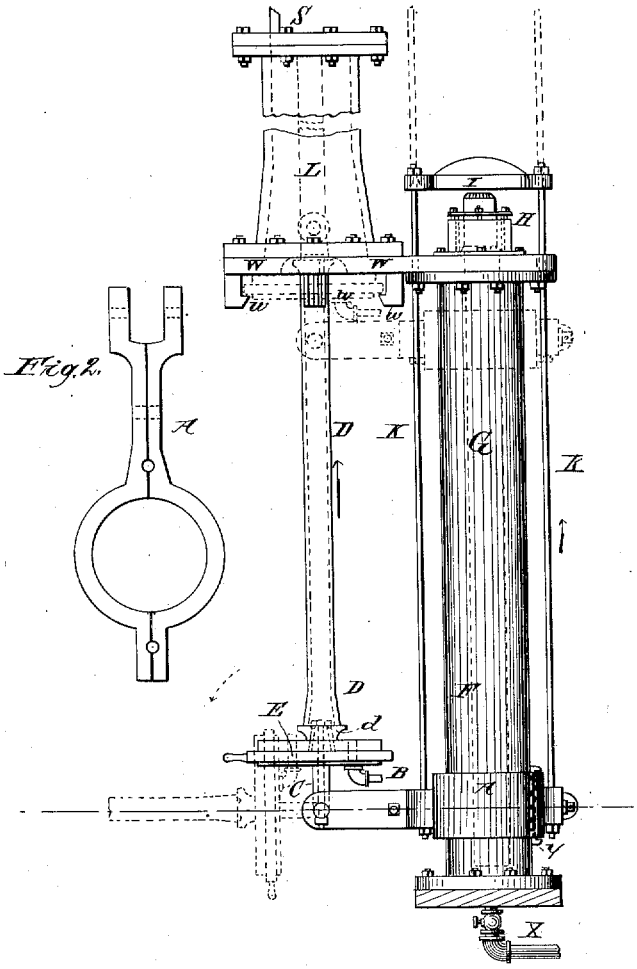
Figure 5:
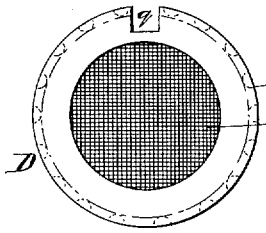
Figure 3:
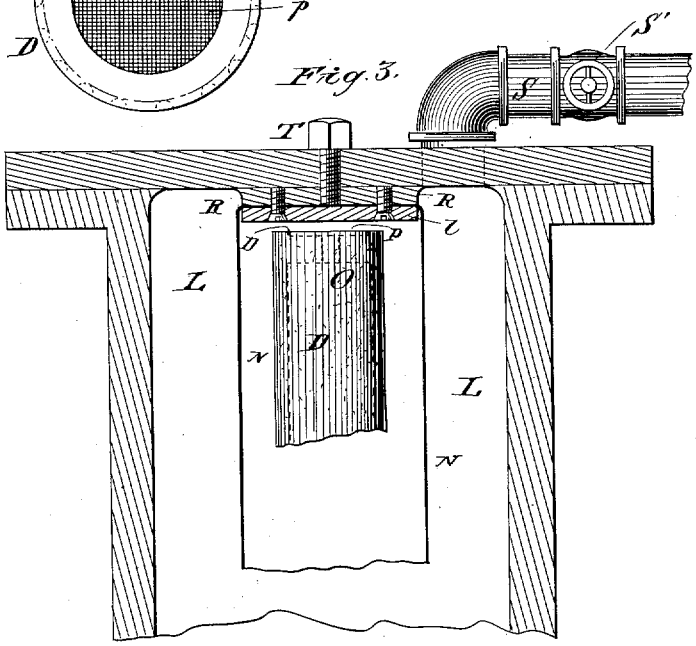
Figure 4:
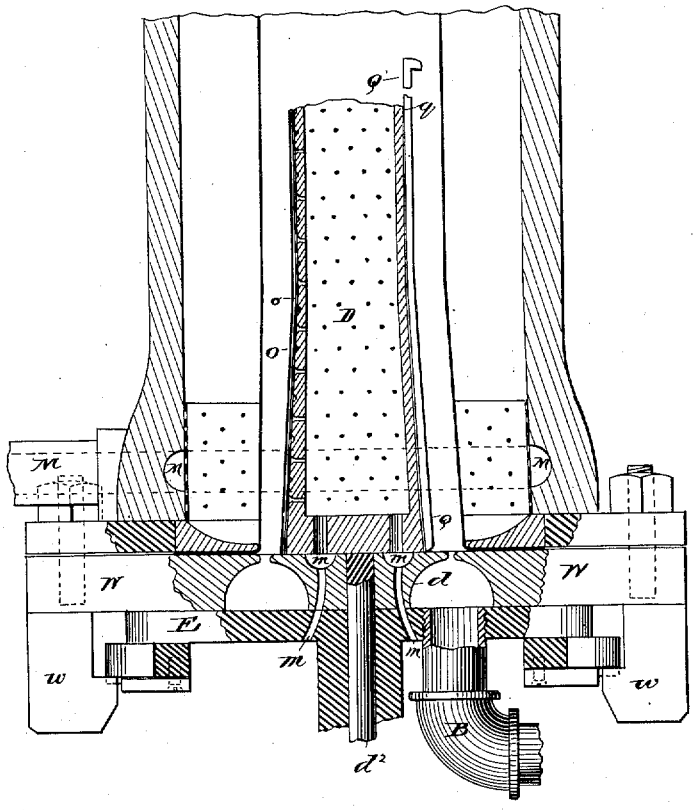

In the drawings, Figure 1 is a side elevation of the machine embodying my improvements, the former D and its lifting device A being shown nearly at their lowest positions, which lowest positions permit the former to be turned down horizontally, as shown in dotted lines, when freed from the molding-cylinder, the said Fig. 1 also showing in dotted lines the elevated position of the lifter A and attached parts B, C, D, and E as when the former D is fully telescoped into the cylinder L. Fig. 2 is a plan view of the lifter or elevator. Fig. 3 is a sectional view of the upper part of the molding-cylinder with the former in the same. Fig. 4 is a sectional view of the lower part of the same with the former inserted and the parts *d* and E locked to the bottom of the said molding-cylinder. Fig. 5 is a plan view of the former. Fig. 6 is a perspective view of the former with its different parts partly removed. Fig. 7 is a similar view of the key of the former removed. Fig. 8 is a perspective view of the former and detachable head, the head being partly detached from the main part. Fig. 9 is a detail of a part of the hinge which connects the lower end of the former to the lifter A. Fig. 10 is a plan view of the locking-ring at the bottom of the molding-cylinder.

Similar letters refer to similar parts throughout the several views.

A is the lifter or elevator, which is raised by rods K, attached to cross-head I, which latter is forced upwardly by plunger G of hydraulic lift F.

B is the stock-pipe or feeder.

C is a portion of the hinge which connects the lower end of the former D to the lifter A, *d* being the detachable head, with outlets *m*, Fig. 4, and $d^2$ the shaft on which it loosely fits.

E is the locking-ring at the bottom of the molding-cylinder.

L, Figs. 1, 3, and 4, is a hollow molding-cylinder for containing a rubber bag N, into which the former is lifted as it ascends, and *l*, Fig. 3, is a movable plate by which the top of the rubber bag N is secured.

M shows apertures for draining the molding-cylinder L when in operation, *m* representing the drainage from the former D.

O is a cloth bag that envelops the former, and *o* is a perforated metallic covering of the former, except the key-slot.

P is the upper end of the former.

*p* is a suitably-supported gauze or wire netting to allow the discharge of the air from the upper part of the bag while being filled with pulp and to admit air to break the vacuum.

*q* is a groove or slot, and Q is a key fitting therein.

R is a plate at the top of molding-cylinder, between which and plate *l* the upper end of rubber bag N is secured.

S, Fig. 3, is a pipe for supplying water under pressure on the outside of rubber bag N.

T is a screw to hold plate R to the top of the molding-cylinder.

W is the base of the molding-cylinder, which has an opening into which passes the head *d*, and with which opening the stock-pipe B communicates. This base is provided with hooks *w* projecting therefrom, into which fit corresponding parts of the locking-ring E.

X, Fig. 1, is the feed-pipe for the hydraulic lift, by means of which power is applied to raise the former into the molding-cylinder when ready to be charged with pulp.

Y is the key to guide-yoke, Fig. 1.

The former D is a hollow cylinder with a slot for a key running its whole length, its outer surface having circular and longitudinal grooves, at the intersections of which are perforations to allow the passage of air and water. The former D (excepting the slot for key Q) is covered with sheet-brass *o*, perforated for the same purpose, and said sheet-brass is covered with a loose bag or sleeve of cloth O, which is held tightly in place by key Q, the insertion of which completes the cylinder. Loosely fixed to a post secured to the lower end of said former D is head *d*, (see Fig. 8,) which may be removed for the purpose of cleaning the former when clogged. Rubber bag N is stationary in molding-cylinder L and is fastened at the top between plates R *l*, as before described, or by any other suitable and common means, as will be readily understood. The said bag is fastened to the base of said molding-cylinder by being clamped between base W and its plate above.

Having thus described the construction of my improved machine, I will now explain the mode of its operation. The former D having been thrown into a perpendicular position, hydraulic pressure is applied at *x*, whereby the lifter A is raised on the cylinder F. (See Fig. 1.) The former D, which is hinged at the lower part to lifter A, is forced up into the elastic-rubber bag N, as seen in Fig. 4, and when up its full length within said bag it is locked in position as long as may be desired. The pulp or stock is then pumped through the pipe or feeder B, so that the pulp passes in between the former D and rubber bag N until said rubber bag is fully expanded against the inner surface of molding-cylinder L. When sufficient pulp shall have been thus pumped in to fill the space so that the pulp is tightly pressed between the former D and the rubber bag N, the supply is shut off. Hydraulic pressure is then applied to the exterior of rubber bag N through pipe S, Fig. 3, and the water expressed from the pulp passes through the strainer-cloth and perforated plate and through the various grooves or channels cut in the former D and through drainage-outlets at *m*. The paper-pulp is thus compressed into a tube. When the pressure within molding-cylinder L has been sufficient, by means of a three-way cock S′ in the pipe S at the top or other suitable means, air is admitted into said cylinder and the water allowed to pass out through a cock in a pipe communicating with the outlet M at the base of said cylinder. The former D is then unlocked from said cylinder, and air passing up through former D breaks the vacuum between rubber bag N and the newly-formed pipe or tube. The said rubber bag becomes thereby detached from said pipe or tube, and the latter can be withdrawn without injury to either the bag or the article formed. Former D being then withdrawn from molding-cylinder L by an operation the reverse of that by which it was inserted, it is turned down by means of hinge C to a horizontal position. Key Q is then withdrawn, so that cloth bag O becomes slack or loose, and the newly-made pipe or tube may readily be taken off from former D with cloth O.

Having thus fully described my invention, what I claim, and desire to secure by Letters Patent, is—

1. The combination of the molding-cylinder L, having inlet water-pipe S and outlet water-pipe M, the rubber bag secured at both top and bottom of the cylinder, the adjustable foraminated former D, with detachable head *d*, having water-outlets *m* in the same, the rotary adjustable locking-ring E, and the hooks *w*, substantially as and for the purposes described.

2. The grooved and perforated metal cylinder D, having groove *q*, the foraminated jacket *o*, of metal, the outer covering O, of cloth, and the locking-key Q, fitting in the groove *q* and securing the said cloth covering, substantially as shown and described.

3. The combination of the hydraulic jack F G, cross-head I, rods K K, attached lifter A, surrounding the jack-cylinder, the molding-cylinder fixed to the upper end of the jack-cylinder, and the foraminated former D, with head *d*, and the hinge C for connecting the former to the lifter, with an articulated joint, substantially as shown and described.

4. The combination of a molding-cylinder provided with water inlet and outlet pipes, a removable former having an air-passage at its upper end, a water-tight elastic bag between the former and the cylinder and confined at both ends to the molding-cylinder, a pulp-inlet pipe opening at the lower part of the space between the former and the bag, and outlets for the water expressed from the pulp, substantially as set forth.

5. The combination of a molding-cylinder provided with water inlet and outlet pipes, a removable former having an air-passage through its upper end, a water-tight elastic bag fastened at both ends, located between the former and the molding-cylinder, a device for admitting air into the space between the bag and the molding-cylinder, a pulp-inlet pipe opening into the lower part of the space between the former and the elastic bag, and an outlet for the water expressed from the pulp, substantially as set forth.

6. The combination of a molding-cylinder provided with water inlet and outlet pipes, a movable former hinged to its support, whereby it is adapted to both a vertical and a horizontal position, a locking device attached to the former, whereby it may be locked in its position within the molding-cylinder, a water-tight bag fastened at both ends, located between the former and the molding-cylinder, a pulp-inlet pipe opening into the lower part of the space between the former and the water-tight bag, and outlets for the water expressed from the pulp, substantially as set forth.

HORACE J. MEDBERY.

Witnesses:
PHILLIPS ABBOTT,
ROBT. COLEMAN.